(No Model.)
B. REIN.
BRAZING APPARATUS.
No. 604,080. Patented May 17, 1898.
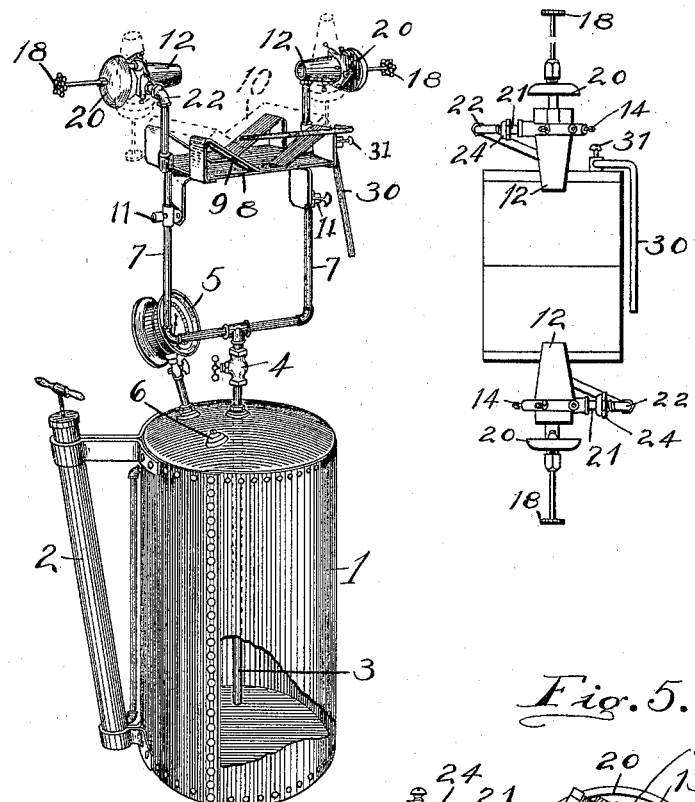
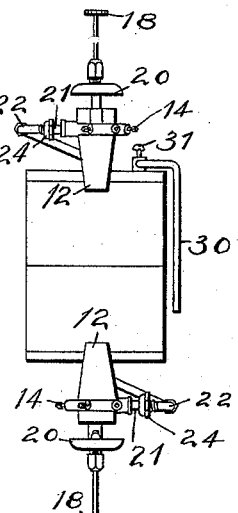
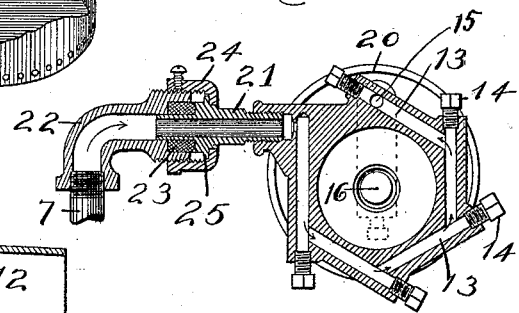
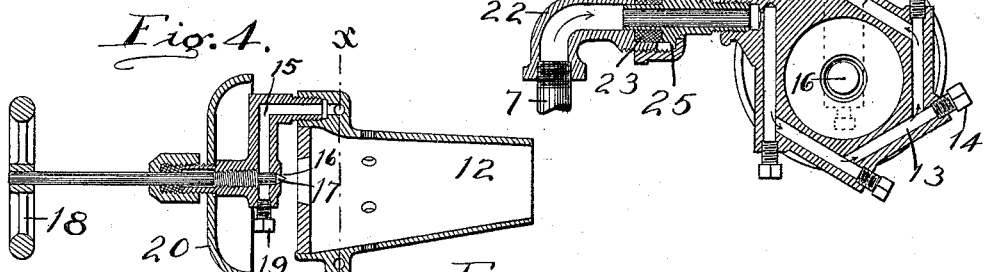
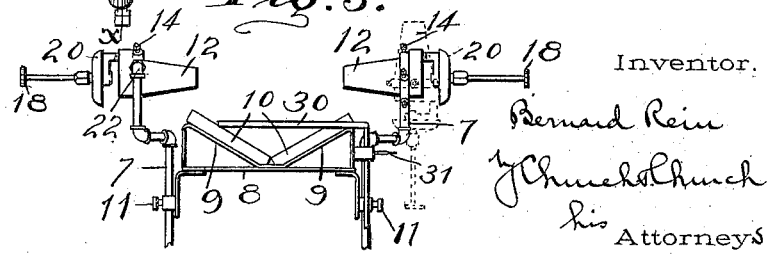
Witnesses.
Ju. Rich.
Ya Roda
Inventor.
Bernard Rein
J Church & Church
his Attorneys
THE NORRIS PETERS CO., PHOTO-LITHO., WASHINGTON, D. C.

UNITED STATES PATENT OFFICE.

BERNARD REIN, OF ROCHESTER, NEW YORK, ASSIGNOR OF ONE-HALF TO THE RED CROSS CEMENT AND RUBBER COMPANY, OF SAME PLACE.

BRAZING APPARATUS.

SPECIFICATION forming part of Letters Patent No. 604,080, dated May 17, 1898.

Application filed December 29, 1897. Serial No. 664,312. (No model.)

*To all whom it may concern:*

Be it known that I, BERNARD REIN, of Rochester, in the county of Monroe and State of New York, have invented certain new and useful Improvements in Brazing Apparatus; and I do hereby declare the following to be a full, clear, and exact description of the same, reference being had to the accompanying drawings, forming a part of this specification, and to the reference-numerals marked thereon.

My present invention has for its object to provide an improved vapor-burning apparatus particularly adapted for brazing or hard-soldering, which shall be simple and cheap in construction and readily adjustable for different kinds of work, and, further, to provide an improved vapor-burner capable of being used in other forms of apparatus.

To these and other ends the invention consists in certain improvements and combinations of parts, all as will be hereinafter fully described, the novel features being pointed out particularly in the claims at the end of this specification.

In the drawings, Figure 1 is a perspective view of a brazing apparatus embodying my improvements; Fig. 2, a plan view of the upper portion, showing the arrangement of the burners; Fig. 3, a front elevation showing the adjustments of the burners; Fig. 4, a longitudinal sectional view of the burner; Fig. 5, a cross-sectional view of the burner on the line $x\ x$ of Fig. 4.

Similar reference-numerals indicate similar parts.

I prefer the apparatus as a whole shall be portable, and therefore mount or support it upon a receptacle or tank 1, adapted to contain a suitable hydrocarbon, as gasolene or other volatile liquid, and having at one side a force-pump 2 for forcing air into the upper portion of the tank to expel the gasolene through the pipe 3, extending nearly to the bottom of the tank and passing out of the top, where it is provided with a stop-cock 4. A suitable pressure-gage 5 is provided at the top of the tank to indicate the amount of air-pressure therein, and the tank may be filled when desired through an aperture in the top closed by a plug 6.

7 7 indicate supply-pipes branching from the pipe 3, extending upward substantially parallel and carrying at their upper ends the vaporizing-burners, and beneath the burners and adjustably secured upon said pipes by set-screws 11 is a work-support or bracket 8, having on its upper side the inclined rests 9 for holding slabs 10 of fire-brick or other refractory material at an angle to each other, as shown in Fig. 3.

The vapor-burners are composed of the hollow metal truncated cone or hood 12, having the annular vaporizing-chamber near one end formed by drilling or boring from the exterior a series of intersecting passages 13, extending tangentially of the circumference of the cone and having their outer ends closed by screw-plugs 14, (see Fig. 5,) the last one of said passages being connected by a pipe or passage 15 with a jet-aperture 16, regulated by a pointed valve 17, having a handle 18. The end of the pipe 15 is also closed by a screw-plug 19, and mounted upon the exterior of the pipe is a cup 20 for containing the oil or fluid necessary to heat up the vaporizing-burner in the usual manner.

21 indicates a pipe screwing into the inlet end of the vaporizing-chamber and swiveled upon the end of a coupling or elbow 22 on the end of the branch pipe 7, so as to permit the burners to be turned up with the cups 20 beneath to hold the gasolene and also to permit their adjustment to vary the direction of the flame with reference to the work-support, as in Fig. 3.

The swiveled connection between the burner and pipes 7 may be formed in any suitable manner; but I prefer to provide the elbow 22 with a chamber for a packing 23 and also with an exterior screw-thread for receiving a correspondingly-threaded cap 24, which in turn engages a collar 25, formed on the pipe 21, said pipe 21 being provided with a shoulder engaging the packing and also with an extended end fitting within the end of the elbow, as shown particularly in Fig. 5, this form of connection permitting the ready adjustments of the parts and their separation when desired for cleaning. The formation of the vaporizing-chamber by the straight-bored passages 13 and the employment of the plugs 14 and 19 at the ends of the passages permits them to be readily cleansed when desired and any deposit or sediment removed. This is a valuable feature in a vapor-burner, as the frequent clogging and choking of the chamber is a constant source of annoyance.

The branch pipes 7, it will be noted, are offset with regard to the work-support, and the burners are on opposite sides of their supply-pipes, so that both burners, which are of similar construction—that is, they are not rights and lefts—may be brought opposite each other, as in Fig. 2, this materially cheapening and simplifying the parts.

The manner of using the device will now be readily understood. The work-support upon which the fire-bricks 10 are located having been adjusted at the right height and the desired air-pressure having been obtained in the tank, the burners are turned up with the cups beneath and the cocks 4 and 17 opened to permit a small quantity of gasolene to enter said cups. Then the gasolene or other material in the cups is lighted for the purpose of heating the burners, and when sufficiently heated to vaporize the gasolene properly the burners are turned down and the flame directed upon the work, their adjustability permitting the flame to be directed to the point or points desired. To facilitate handling the work properly, I provide the work-support with an adjustable arm or rod 30, movable in a socket on the support and held in adjusted position by means of a set-screw 31.

The apparatus described is particularly adapted for bicycle factories and repair-shops, but is capable of use for any purpose where an intense heat is desired, and the burners while particularly adapted for a brazing apparatus can be used in other connections, as will be understood.

While I prefer to employ two burners, as described, it will be understood that one of them and its supply-pipe could be dispensed with and the work-support held adjustably upon the supply-pipe of the remaining one, if desired.

I claim as my invention—

1. The combination with the tank, the stationary vertical oil-supply pipes, having their upper ends offset in opposite directions, of the vapor-burners swiveled on the ends of said pipes and movable in a vertical plane, and the work-support arranged beneath the pivots of the burners.

2. The combination with the tank, the two stationary vertical oil-supply pipes, and the adjustable vapor-burners located at the upper ends of said pipes, of the work-support adjustable vertically on the pipes, and securing devices for holding it in adjusted position thereon.

3. The combination with the tank, the stationary vertical oil-supply pipes, and the adjustable vapor-burners mounted on the upper ends thereof, of the work-support sleeved upon the supply-pipes, and set-screws for holding it in adjusted position.

4. The combination with the vertical oil-supply pipes, having the horizontally-extending upper ends, the vapor-burners rotatably adjustable on said ends, of the work-support arranged beneath the burners.

5. The combination with oil-supply pipes and vapor-burners at the upper ends thereof, of the work-support adjustable on the pipes, and the adjustable arm 30 on said support.

6. The combination with the tank, the pump thereon, the two vertical supply-pipes connecting with the tank and the vapor-burners on the upper ends of the pipes and rotatably adjustable thereon to swing in a vertical plane, and the work-support mounted on the two pipes below the burners, and adjustably connected therewith.

7. The combination with a supply-pipe, of the vapor-burner swiveled thereon to turn in a vertical plane and embodying the hollow body portion, having the vaporizing-chamber formed by the intersecting tangential passages and plugs at their outer ends, the jet-pipe 15 having the plug 19, the valve 18, and the cup 20 carried by the jet-pipe.

8. The combination with the work-support, the inclined slabs of refractory material thereon, and the oppositely-arranged adjustable vapor-burners coöperating with the slabs.

9. A vapor-burner embodying the hollow truncated cone and having the jet-aperture and a vaporizing-chamber connected with the jet-aperture and formed in the cone by a series of tangential intersecting passages, and plugs for closing the outer ends of said passages.

10. In a vapor-burner, the combination with the hollow conical body portion having the vaporizing-chamber formed by a series of intersecting tangential passages and removable plugs at their outer ends, of a supply-pipe connecting with one end of said chamber, and a jet-pipe connected to the other end and discharging into the body.

11. In a vapor-burner, the combination with the hollow body portion having the vaporizing-chamber therein formed of a series of intersecting tangential passages and removable plugs in their outer ends, of the jet-pipe 15 connected to the vaporizing-chamber having the plug 19, and the jet-aperture and valve controlling said aperture.

BERNARD REIN.

Witnesses:
F. F. CHURCH,
G. W. RICH.